W. HALL, Jr.
Cover for Pots.

No. 221,057. Patented Oct. 28, 1879.

ATTEST:
Chas. M. Higgins
John E. Gavin

INVENTOR:
William Hall Jr.
by S. H. Wales
his Atty.

UNITED STATES PATENT OFFICE.

WILLIAM HALL, JR., OF NORTH ADAMS, MASSACHUSETTS.

IMPROVEMENT IN COVERS FOR POTS.

Specification forming part of Letters Patent No. 221,057, dated October 28, 1879; application filed July 30, 1879.

*To all whom it may concern:*

Be it known that I, WILLIAM HALL, Jr., of North Adams, Berkshire county, State of Massachusetts, have invented certain new and useful Improvements in Covers for Pots, Saucepans, &c., of which the following is a specification.

My invention relates to that class of pot-covers having a grated opening in the top, sometimes covered by a sliding flap, or by a hinged gravitating flap or segment of the cover, and sometimes by a lip or spout, to admit of the hot water being strained off the contained eatables without allowing the latter to fall out; and it applies to that kind in which the straining-opening is covered by a spout or lip projecting over the edge of the cover.

Figure 1:
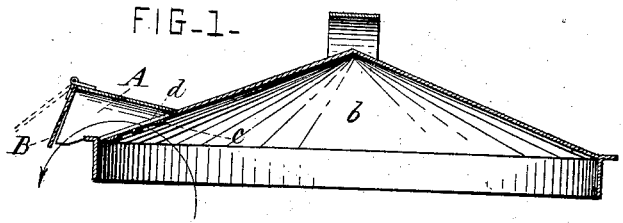
Figure 2:
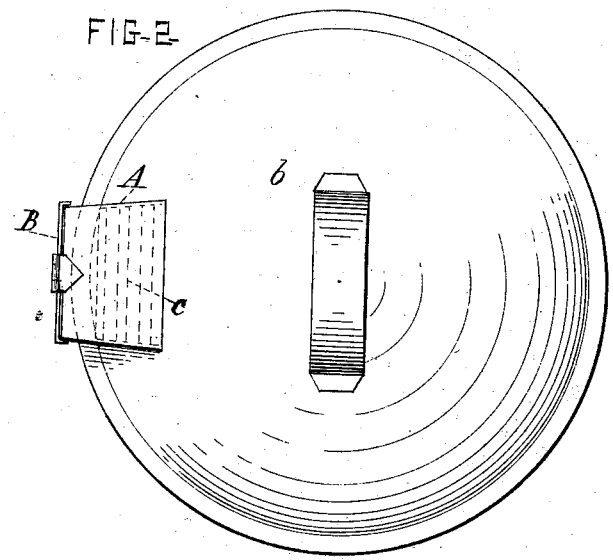
Figure 3:
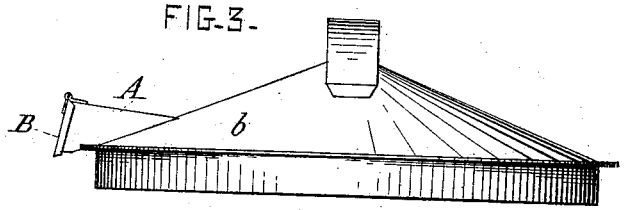

Figure 1 of the annexed drawings presents a sectional view of my improvement thereon; Fig. 2, a plan view, and Fig. 3 a side elevation thereof.

In the drawings, $b$ indicates the cover, $d$ the straining-opening therein, and A a distinct spout or chute rising out of the top of the cover near the margin thereof and over the aperture $d$ therein, and projecting laterally therefrom over the edge of the cover, where its mouth opens outwardly and downwardly beyond the edge of the cover, as shown best in Fig. 1, by which means it will be seen that the outflowing water is directed in a confined stream over the edge of the vessel.

The spout A is preferably of a short broad rectangular form, as shown, and its opening into the cover is guarded by usual grating or bars $c\ c$, to retain the solid contents of the vessel while allowing the water to escape. The outer extremity or mouth of the spout, which overhangs the edge of the cover, is provided with a pendent cap or shield, B, hinged at its top edge to the extremity of the spout, as shown. It will be readily seen that, owing to the pendent character of this cap or lid, it will be shut by gravity when the vessel with its cover is placed in the upright position, and thus retain the steam while the cooking is going on; but when the vessel and cover are inclined to drain off the water the cap B will open by gravity, to allow the outflow, as indicated by dotted lines, and, assuming an inclined position, will serve to deflect the water and steam downward, and thus more effectually guard the hands therefrom, thus presenting a material improvement on the spouted cover.

What I claim as my invention is—

A cover for pots or other vessels constructed with the spout A, provided with the pendent mouth-cap B, substantially as herein shown and described.

WILLIAM HALL, JR.

Witnesses:
J. W. D. MYER,
N. H. STOWELL.